(12) United States Patent
Kim

(10) Patent No.: US 12,091,000 B2
(45) Date of Patent: Sep. 17, 2024

(54) DRIVER ASSISTANCE SYSTEM AND CONTROL METHOD THEREOF

(71) Applicant: MANDO CORPORATION, Pyeongtaek-si (KR)

(72) Inventor: Hyunbeom Kim, Suwon-si (KR)

(73) Assignee: HL KLEMOVE CORP., Incheon (KR)

( * ) Notice: Subject to any disclaimer, the term of this patent is extended or adjusted under 35 U.S.C. 154(b) by 362 days.

(21) Appl. No.: 17/341,773

(22) Filed: Jun. 8, 2021

(65) Prior Publication Data

US 2021/0380102 A1 Dec. 9, 2021

(30) Foreign Application Priority Data

Jun. 8, 2020 (KR) .................. 10-2020-0068839

(51) Int. Cl.
*B60W 30/095* (2012.01)
*B60W 10/20* (2006.01)
*B60W 30/19* (2012.01)
*G06V 20/58* (2022.01)

(52) U.S. Cl.
CPC .......... *B60W 30/095* (2013.01); *B60W 10/20* (2013.01); *B60W 30/19* (2013.01); *G06V 20/58* (2022.01); *B60W 2710/0672* (2013.01)

(58) Field of Classification Search
CPC .... B60W 30/095; B60W 10/20; B60W 30/19; B60W 2710/0672; B60W 30/0956; B60W 10/18; B60W 30/09; B60W 2420/42; B60W 2554/80; B60W 2710/18; B60W 2710/202; B60W 30/08; B60W 40/02; B60W 2050/0005; B60W 2420/52; B60W 2554/00; G06V 20/58; B62D 15/0265; B62D 15/025; B62D 6/008; B62D 6/08; B60Y 2300/08
USPC .......................................................... 701/41
See application file for complete search history.

(56) References Cited

U.S. PATENT DOCUMENTS

| 10,759,421 | B2 * | 9/2020 | Nagata | G06V 20/58 |
| 2009/0192710 | A1 * | 7/2009 | Eidehall | B60W 50/0097 701/300 |
| 2012/0101701 | A1 * | 4/2012 | Moshchuk | B60W 30/09 701/70 |
| 2013/0253767 | A1 * | 9/2013 | Lee | B60W 50/04 701/41 |

(Continued)

FOREIGN PATENT DOCUMENTS

GB 2583898 A * 11/2020 ............ B60W 10/20

*Primary Examiner* — Adam D Tissot
*Assistant Examiner* — Jean W Charleston
(74) *Attorney, Agent, or Firm* — Harvest IP Law, LLC

(57) ABSTRACT

Provided is an apparatus for assisting driving of a host vehicle, the apparatus comprising: a camera mounted to the host vehicle and having a field of view in front of the host vehicle, the camera configured to acquire image data; and a controller including a processor configured to process the image data. The controller may identify at least one object obstructing driving of the host vehicle based on the image data, and control a steering controller of a steering device to apply a periodically varying dithering torque to the steering device of the host vehicle in response to a collision with the at least one object being expected. The apparatus for assisting driving of a host vehicle may shorten the response time for emergency steering.

15 Claims, 10 Drawing Sheets

(56) References Cited

U.S. PATENT DOCUMENTS

| | | | |
|---|---|---|---|
| 2015/0291216 A1* | 10/2015 | Sato | B62D 15/0265 |
| | | | 701/41 |
| 2016/0264135 A1* | 9/2016 | Yamakado | B60W 30/18145 |
| 2017/0113664 A1* | 4/2017 | Nix | G06V 20/56 |
| 2017/0210383 A1* | 7/2017 | Nishimura | B60W 30/09 |
| 2018/0154891 A1* | 6/2018 | Schneider | B60T 8/00 |
| 2018/0162444 A1* | 6/2018 | Park | G08G 1/166 |
| 2019/0031105 A1* | 1/2019 | Kim | B60R 1/088 |
| 2019/0031190 A1* | 1/2019 | Choi | B60W 10/10 |
| 2019/0061743 A1* | 2/2019 | Ozawa | B60W 20/15 |
| 2019/0064829 A1* | 2/2019 | Ozawa | G05D 1/0214 |
| 2019/0126915 A1* | 5/2019 | Kim | B60W 30/09 |
| 2019/0291730 A1* | 9/2019 | Kamiya | G06V 20/58 |
| 2020/0047749 A1* | 2/2020 | Morotomi | B60W 30/09 |
| 2020/0055517 A1* | 2/2020 | Kim | B60W 30/0956 |
| 2020/0102010 A1* | 4/2020 | Kim | B60W 50/08 |
| 2020/0238904 A1* | 7/2020 | Kim | G01S 13/867 |

\* cited by examiner

[FIG. 1]
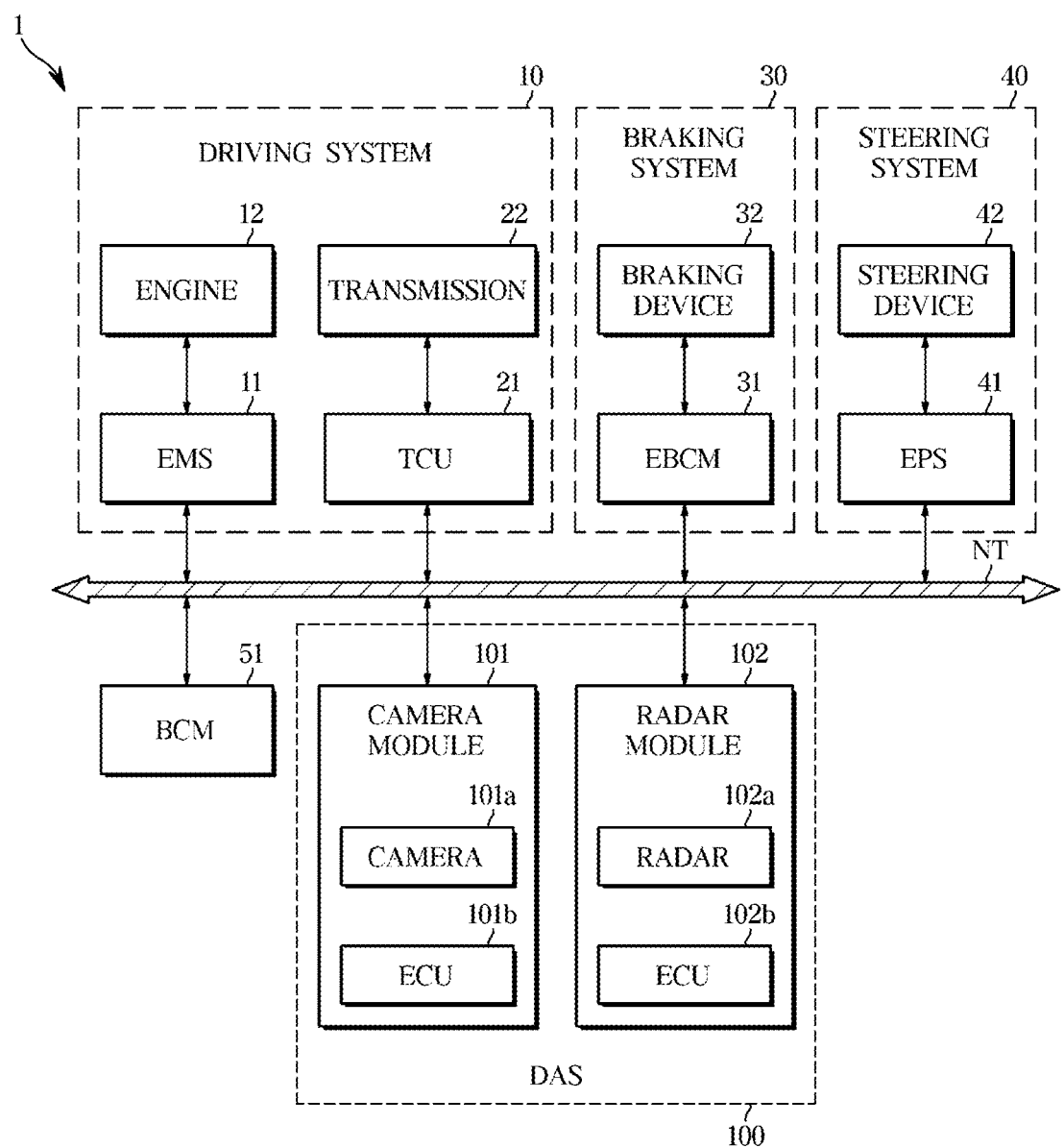

[FIG. 2]
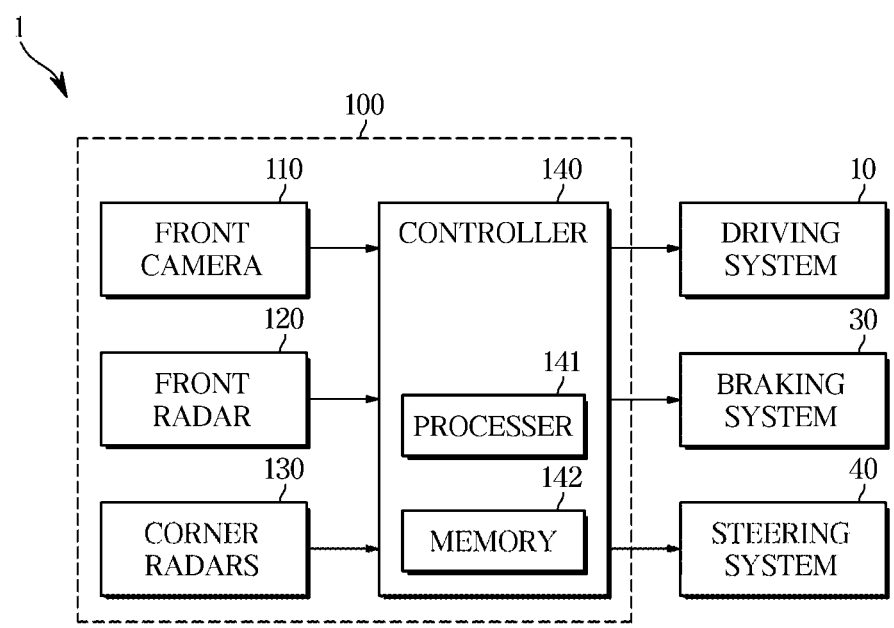

[FIG. 3]
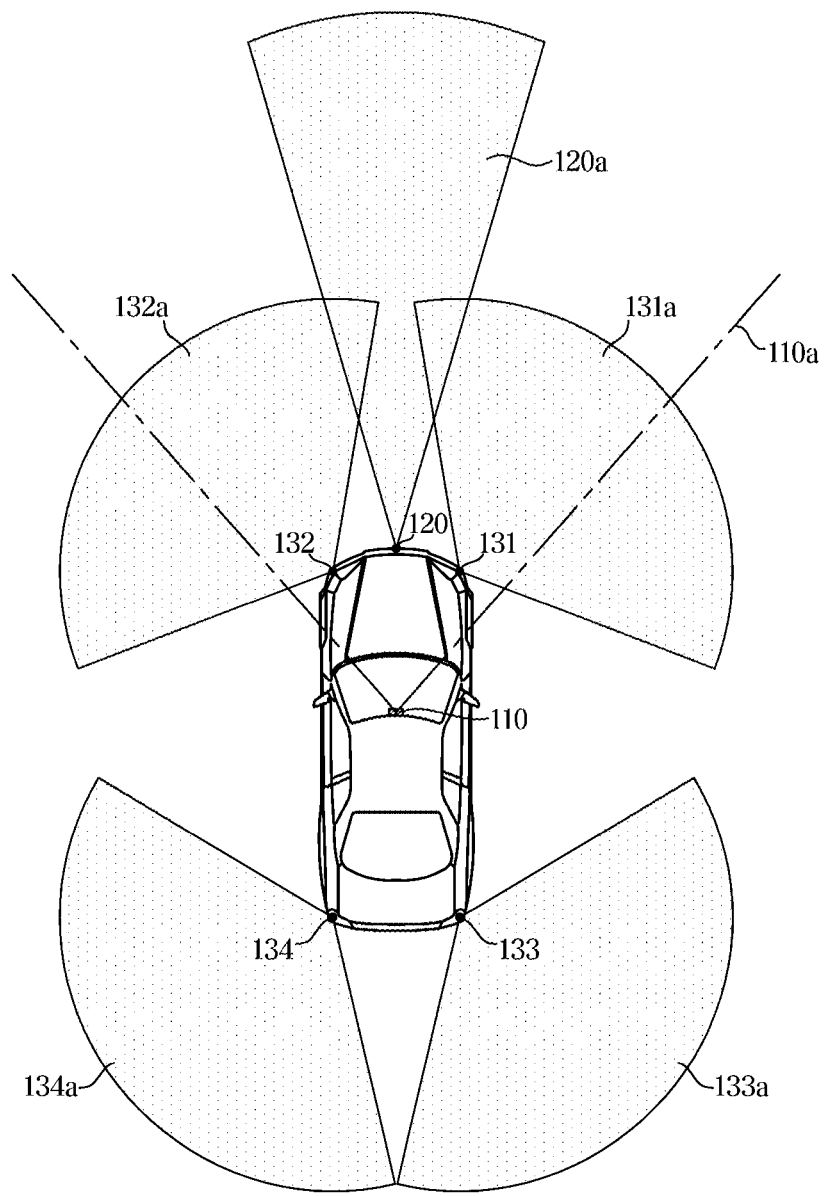

[FIG. 4]
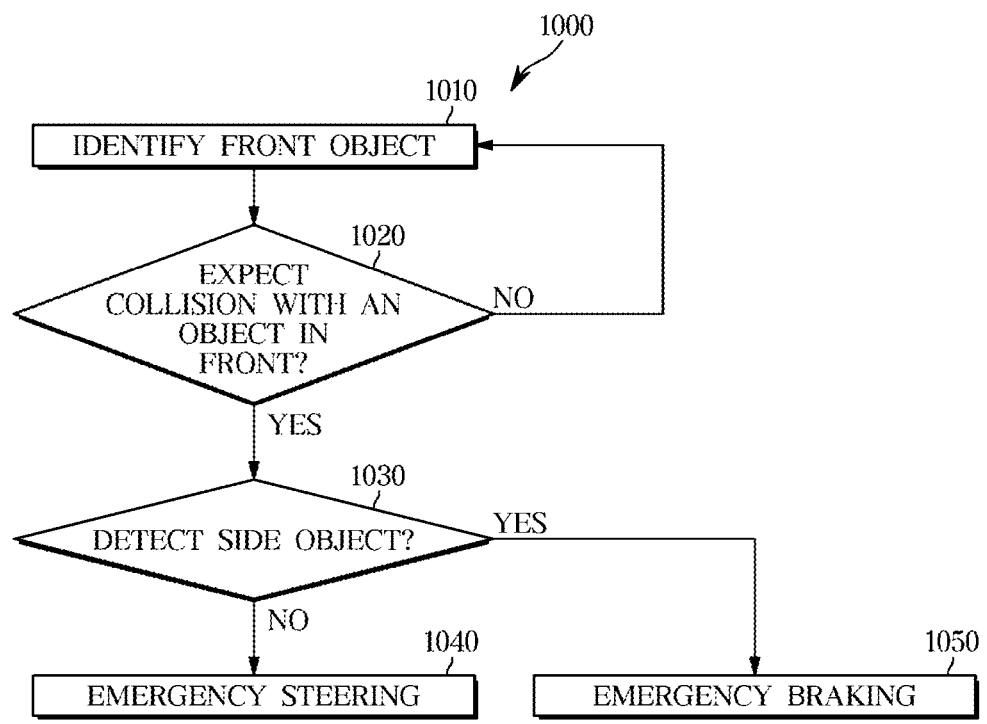

[FIG. 5]
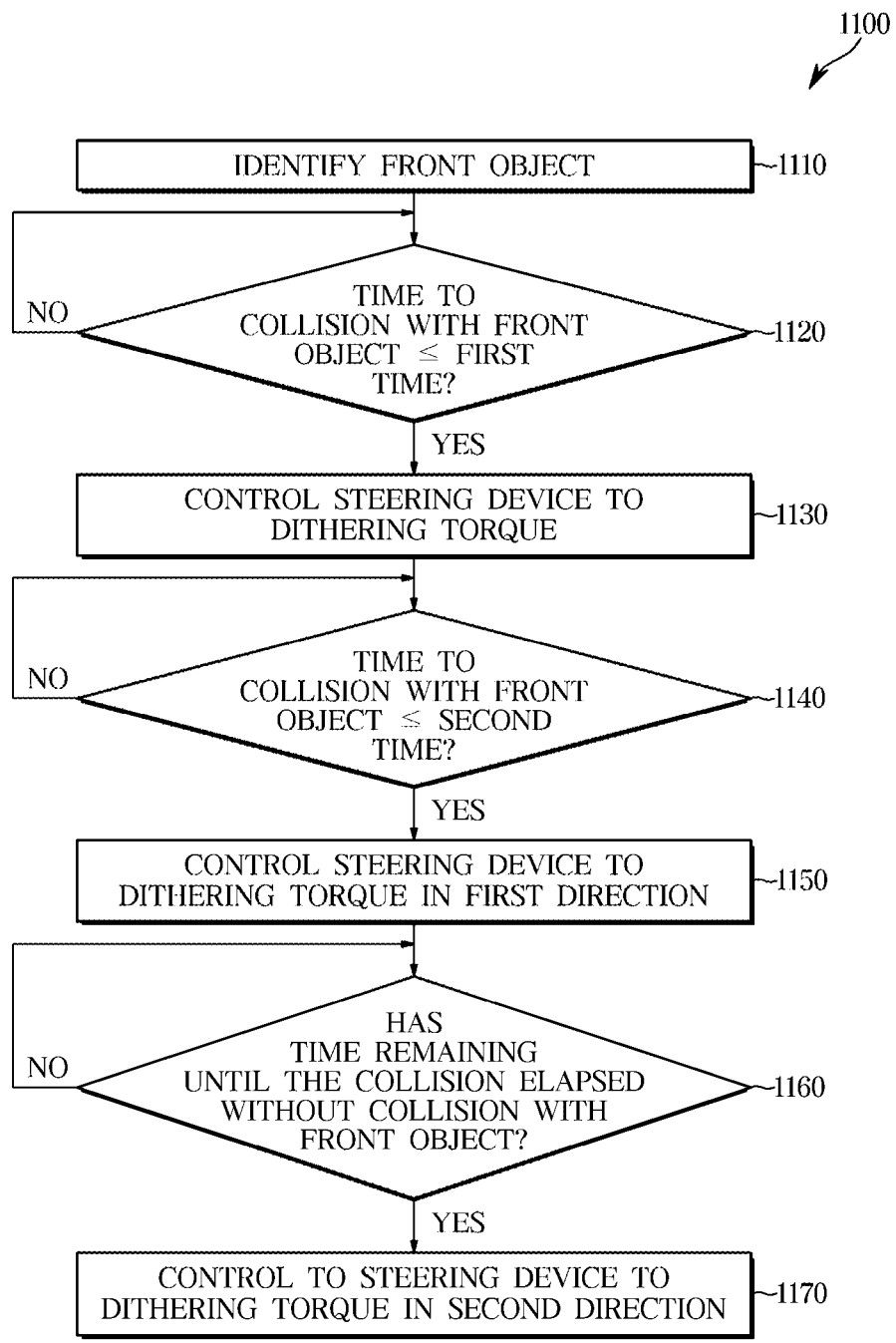

[FIG. 6]
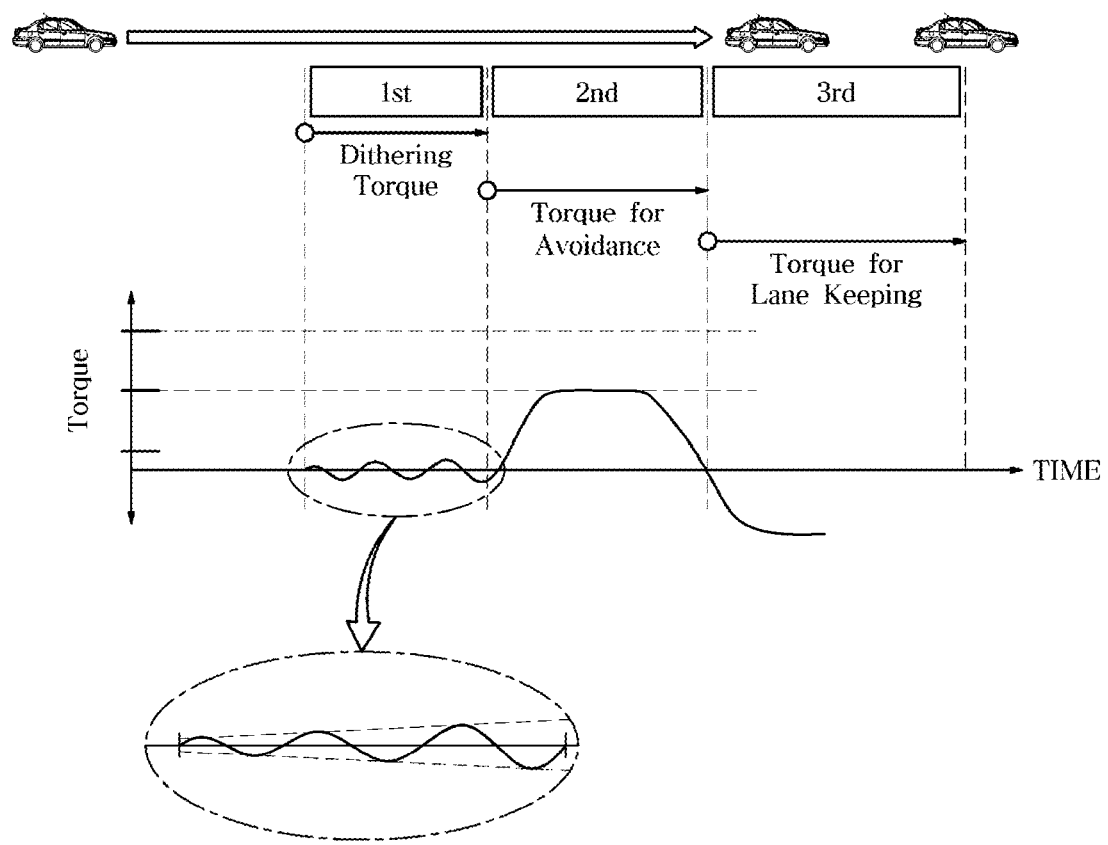

[FIG. 7]
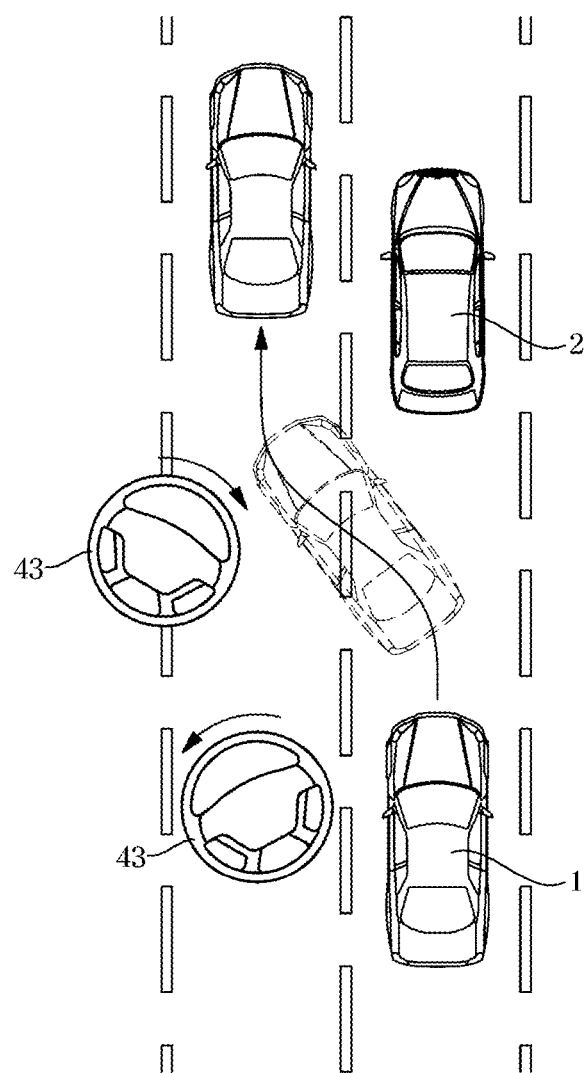

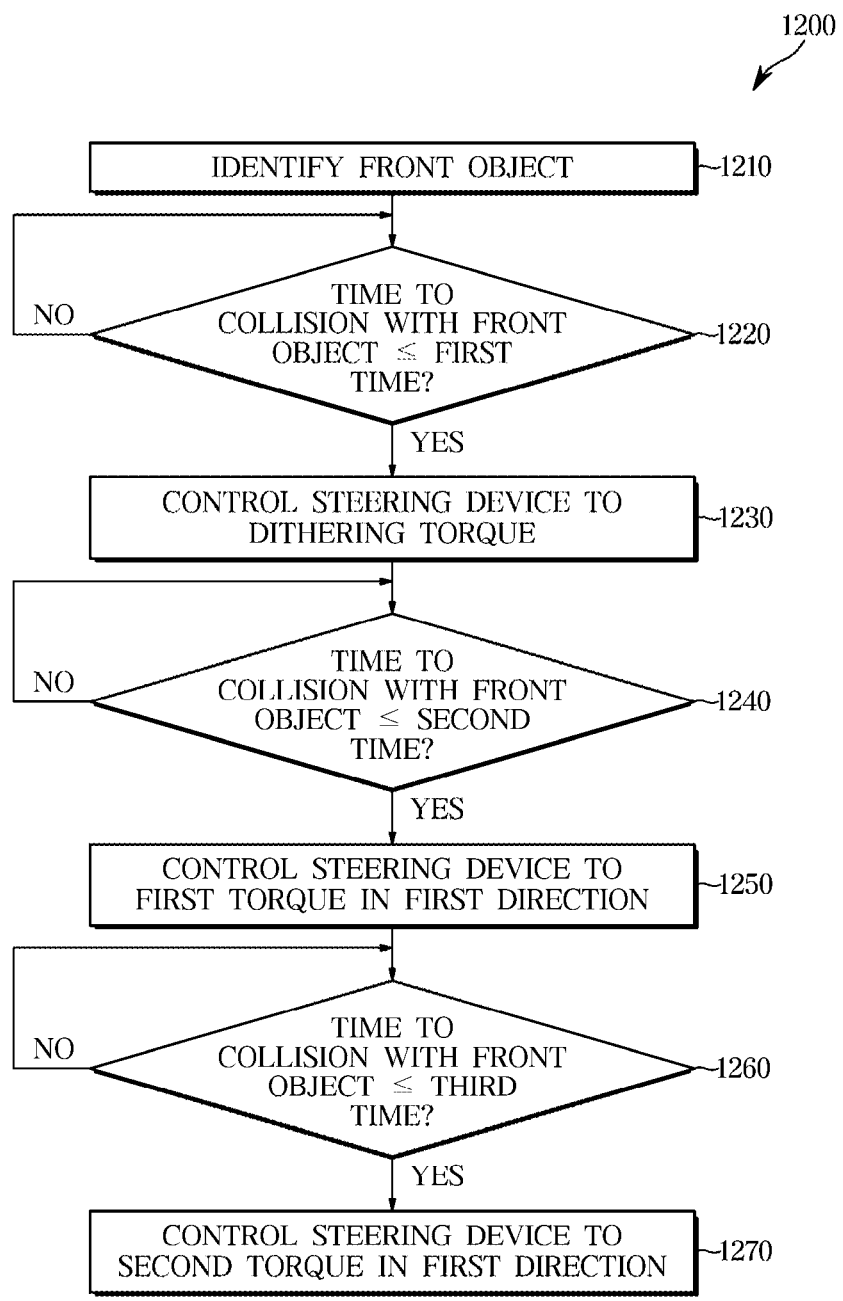
[FIG. 8]

[FIG. 9]
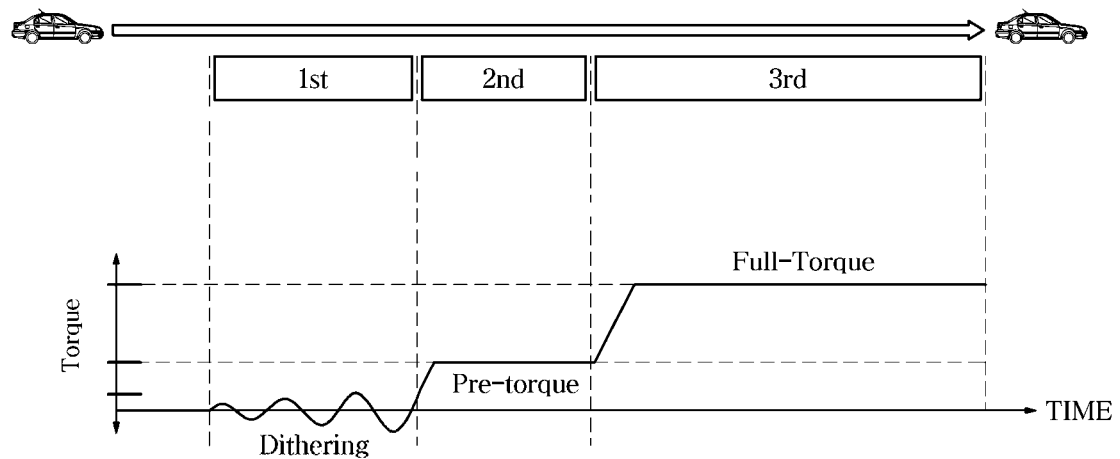

[FIG. 10]
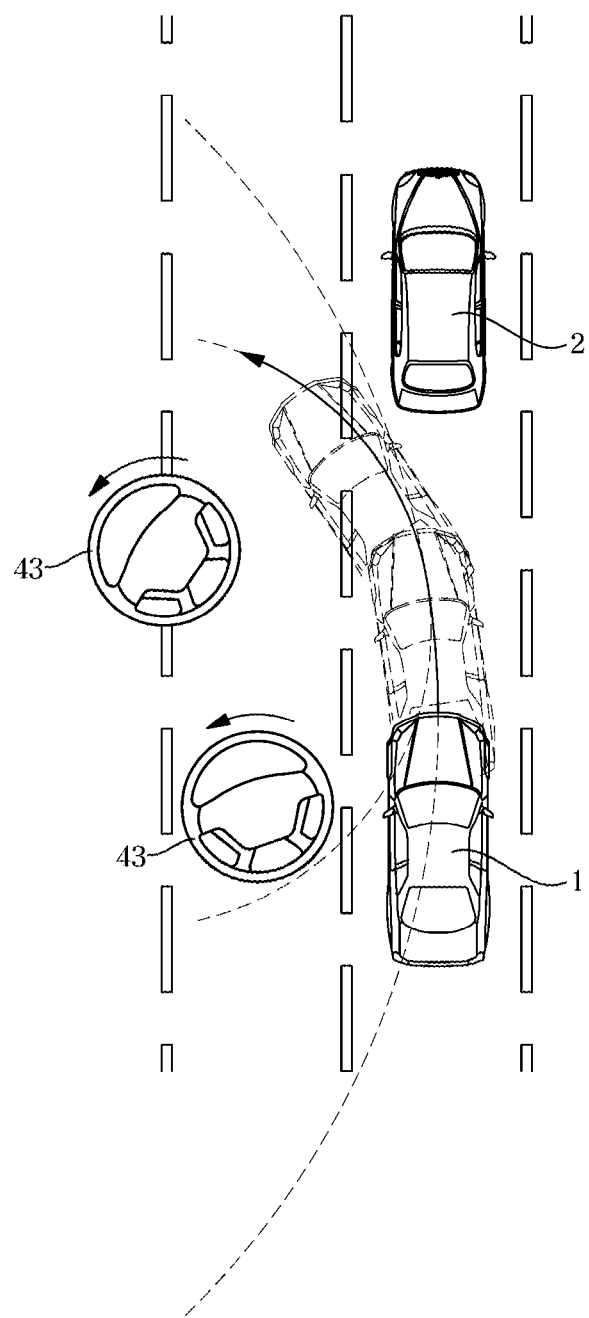

DRIVER ASSISTANCE SYSTEM AND CONTROL METHOD THEREOF

CROSS-REFERENCE TO RELATED APPLICATION

This application is based on and claims priority under 35 U.S.C. § 119 to Korean Patent Application No. 10-2020-0068839, filed on Jun. 8, 2020 in the Korean Intellectual Property Office, the disclosure of which is incorporated herein by reference.

BACKGROUND

1. Field

The present disclosure relates to a driver assistance apparatus, and more particularly, to a driver assistance apparatus capable of avoiding a collision with an object.

2. Description of the Related Art

Generally, a vehicle refer to a moving means or a transportation means that travels on a road or track using fossil fuel, electricity, or the like as a power source. Vehicles may be moved to various positions mainly by using one or more wheels mounted on the vehicle body. The vehicle may be moved to various positions mainly by using one or more wheels installed on the vehicle body. Such a vehicle may include a three-wheeled or four-wheeled vehicle, a two-wheeled vehicle such as a motorcycle, a construction machine, a bicycle, and a train running on a rail disposed on a track.

Vehicles are the most common transportation means in modern society, and the number of people using the vehicles is increasing. Due to the development of vehicle technology, long-distance movements are easy and life is easy, but in places with high population density, such as in Korea, road traffic conditions deteriorate and traffic congestion often occurs.

Recently, in order to reduce the burden on the driver and improve convenience, studies on vehicles equipped with an advanced driver assistance system (ADAS) that actively provides information on vehicle state, driver state, and surrounding environment has been actively conducted.

Examples of advanced driver assistance systems mounted on vehicles include Forward Collision Avoidance (FCA), Autonomous Emergency Brake (AEB), and Driver Attention Warning (DAW). Such a system is a system that determines the risk of collision with an object in a driving situation of a vehicle, and provides a collision avoidance and warning through emergency braking in a crash situation.

However, the emergency braking alone did not sufficiently avoid the collision between the vehicle and the object.

SUMMARY

Therefore, it is an aspect of the present disclosure to provide a driver assistance system and a driver assisting method capable of avoiding a collision between a vehicle and a front object by using emergency steering.

It is an aspect of the present disclosure to provide a driver assistance system and a driver assistance method capable of shortening a response time for emergency steering.

In accordance with one aspect of the present disclosure, there is provided an apparatus for assisting driving of a host vehicle, the apparatus comprising: a camera mounted to the host vehicle and having a field of view in front of the host vehicle, the camera configured to acquire image data; and a controller including a processor configured to process the image data. The controller may identify at least one object obstructing driving of the host vehicle based on the image data, and control a steering controller of a steering device to apply a periodically varying dithering torque to the steering device of the host vehicle in response to a collision with the at least one object being expected.

The controller may control the steering controller to alternately apply a torque in a first direction and a torque in a second direction to the steering device in response to the collision with the at least one object being expected.

The controller may control the steering controller to alternately apply a torque in a first direction and a torque in a second direction to the steering device in response to the collision with the at least one object being expected.

The controller may control the steering controller to increase a magnitude of the dithering torque as a time to collision with the at least one object decreases.

The controller may control the steering controller to periodically apply a pulse-shaped torque to the steering device and to decrease a time interval between the pulse-shaped torque as the time to collision with the at least one object decreases, in response to the collision with the at least one object being expected.

The controller may control the steering controller to apply a periodically varying dithering torque to the steering device in response to a remaining time until a collision between the host vehicle and the front object being less than a first time.

The controller may control the steering controller to apply a first torque to the steering device in response to the time to collision between the host vehicle and the front object being less than or equal to a second time less than the first time.

The controller may control the steering controller to apply a second torque in a direction opposite to the first torque to the steering device in response to the time to collision between the host vehicle and the front object being increase.

The controller may control the steering controller to apply a second torque larger than the first torque to the steering device in response to the time to collision between the host vehicle and the front object being less than or equal to a third time less than the second time.

In accordance with one aspect of the present disclosure, there is provided a method for assisting driving of a host vehicle, the method comprising: processing image data acquired by a camera installed in a host vehicle and having a front view of the host vehicle; identifying at least one object obstructing driving of the host vehicle based on the image data; and applying a periodically varying dithering torque to a steering device of the host vehicle in response to a collision with the at least one object being expected.

In accordance with one aspect of the present disclosure, there is provided an apparatus for assisting driving of a host vehicle, the apparatus comprising: a camera mounted to the host vehicle and having a field of view in front of the host vehicle, the camera configured to acquire image data; a sensor mounted to the host vehicle, having a field of sensing for at least one of a front and a side of the host vehicle, and acquired to sensing data in a group consisting of a radar sensor and a Light Detection and Ranging (LiDAR) sensor; and a controller including a processor configured to process the image data. The controller may identify at least one object obstructing driving of the host vehicle based on the image data, predict a collision with the at least one object based on the sensing data, and control the steering controller of the steering device to apply a periodically varying dithering torque to the steering device of the host vehicle in response to the collision with the at least one object being expected.

BRIEF DESCRIPTION OF THE DRAWINGS

These and/or other aspects of the disclosure will become apparent and more readily appreciated from the following description of the embodiments, taken in conjunction with the accompanying drawings of which:

FIG. 1 illustrates a configuration of a vehicle according to an embodiment;

FIG. 2 illustrates a configuration of a driver assistance apparatus according to an embodiment;

FIG. 3 illustrates a field of view of a camera and a radar included in a driver assistance apparatus according to an embodiment;

FIG. 4 illustrates a method for collision avoidance of a driver assistance apparatus according to an embodiment;

FIG. 5 illustrates an emergency steering method of a driver assistance apparatus according to an embodiment.

FIG. 6 illustrates a torque applied to a steering device by the emergency steering method shown in FIG. 5;

FIG. 7 illustrates collision avoidance of a vehicle by the emergency steering method shown in FIG. 5;

FIG. 8 illustrates an emergency steering method of a driver assistance apparatus according to an embodiment;

FIG. 9 illustrates a torque applied to the steering device by the emergency steering method shown in FIG. 8; and FIG. 10 illustrates collision avoidance of a vehicle by the emergency steering method shown in FIG. 8.

DETAILED DESCRIPTION

The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. The progression of processing operations described is an example; however, the sequence of and/or operations is not limited to that set forth herein and may be changed as is known in the art, with the exception of operations necessarily occurring in a particular order. In addition, respective descriptions of well-known functions and constructions may be omitted for increased clarity and conciseness.

Additionally, exemplary embodiments will now be described more fully hereinafter with reference to the accompanying drawings. The exemplary embodiments may, however, be embodied in many different forms and should not be construed as being limited to the embodiments set forth herein. These embodiments are provided so that this disclosure will be thorough and complete and will fully convey the exemplary embodiments to those of ordinary skill in the art. Like numerals denote like elements throughout.

It will be understood that, although the terms first, second, etc. may be used herein to describe various elements, these elements should not be limited by these terms. These terms are only used to distinguish one element from another. As used herein, the term "and/or," includes any and all combinations of one or more of the associated listed items.

It will be understood that when an element is referred to as being "connected," or "coupled," to another element, it can be directly connected or coupled to the other element or intervening elements may be present. In contrast, when an element is referred to as being "directly connected," or "directly coupled," to another element, there are no intervening elements present.

The terminology used herein is for the purpose of describing particular embodiments only and is not intended to be limiting. As used herein, the singular forms "a," "an," and "the," are intended to include the plural forms as well, unless the context clearly indicates otherwise.

Reference will now be made in detail to the exemplary embodiments of the present disclosure, examples of which are illustrated in the accompanying drawings, wherein like reference numerals refer to like elements throughout.

The expression, "at least one of a, b, and c," should be understood as including only a, only b, only c, both a and b, both a and c, both b and c, or all of a, b, and c.

Hereinafter, the operating principles and embodiments of the present disclosure will be described with reference to the accompanying drawings.

FIG. 1 illustrates a configuration of a vehicle according to an embodiment.

As shown in FIG. 1, the vehicle 1 includes a drive system 10, a braking system 30 and a steering system 40.

The driving system 10 may move the vehicle 1, and include an engine management system (EMS) 11, an engine 12, a transmission control unit (TCU) 21 and a transmission 22.

The engine 10 includes a cylinder and a piston, and may generate power for the host vehicle 1 to travel. The transmission 20 includes a plurality of gears, and may transmit power generated by the engine 10 to a wheel.

The EMS 11 may control the engine 12 in response to a driver's acceleration intention through an accelerator pedal or a request from the driver assistance system 100. For example, the EMS 11 may control the torque of the engine 10.

The TCU 21 may control the transmission 22 in response to a driver's shift command through a shift lever and/or a driving speed of the host vehicle 1. For example, the TCU 21 may adjust a shift ratio from the engine 12 to the wheel.

The braking system 30 may stop the vehicle 1 and may include an Electronic Brake Control Module (EBCM) 31 and a braking device 32.

The braking device 32 may decelerate the vehicle 1 or stop the vehicle 1 through friction with the wheel.

The EBCM 31 may control the braking device 32 in response to a driver's braking intention through a braking pedal and/or slip of wheels. For example, the EBCM 31 may control the braking device 32 to temporarily release the braking of the wheel in response to the slip of a wheel detected when the host vehicle 1 is braking (Anti-lock Braking Systems, ABS). The EBCM 31 may control the braking device 32 to selectively release the braking of the wheel in response to oversteering and/or understeering detected when the host vehicle 1 is steered (Electronic stability control, ESC). In addition, the EBCM 31 may control the braking device 32 to temporarily brake the wheel in response to the slip of the wheel detected when the host vehicle 1 is driven (Traction Control System, TCS).

In addition, the EBCM 31 may control the braking device 32 in response to a request from the driver assistance system 100. For example, the EBCM 31 may receive a deceleration request including a deceleration rate from the driver assistance system 100, and control the braking device 32 so that the vehicle 1 decelerates depending on the requested deceleration.

The steering system 40 may include an electronic power steering control module (EPS) 41 and a steering device 42.

The steering device 42 may change the traveling direction of the vehicle 1.

The EPS 41 may assist the operation of the steering device 42 so that the driver may easily manipulate the steering wheel in response to the driver's intention to steer through the steering wheel. For example, the EPS 41 may assist the operation of the steering device 42 to decrease the steering force upon driving at a low speed or parking and increase the steering force upon driving at a high speed.

Further, the EPS 41 may control the steering device 42 in response to a request from the driver assistance system 100. For example, the EPS 41 may receive a steering request including a steering torque from the driver assistance system 100, and control the steering device 42 to steer the vehicle 1 depending on the requested steering torque.

The vehicle 1 further includes a body control module (BCM) 51 and a driver assistance system (DAS) 100 for safety and convenience of the driver.

The BCM 51 may control the operation of the electronic components that provide convenience to the driver or ensure the safety of the driver. For example, the BCM 51 may control a head lamp, a wiper, a cluster, a multifunction switch, a turn signal lamp, and the like.

The DAS 100 may assist the driver in manipulating (driving, braking, steering) the vehicle 1. For example, the DAS 100 may detect a surrounding environment (e.g., another vehicle, a pedestrian, a cyclist, a lane, a road sign, etc.) around the vehicle 1 and control the driving and/or braking and/or steering of the vehicle 1 in response to the sensed surrounding environment.

The DAS 100 may provide the driver with various functions. For example, the DAS 60 may provide a lane departure warning (LDW), a lane keeping assist (LKA), a high beam assist (HBA), an autonomous emergency braking (AEB), a traffic sign recognition (TSR), an adaptive cruise control (ACC), a blind spot detection (BSD), and the like.

The DAS 100 may include a camera module 101 for acquiring image data around the vehicle 1 and a radar module 102 for acquiring object data around the vehicle 1. The camera module 101 may include a camera 101a and an electronic control unit (ECU) 101b, and may photograph the front of the vehicle 1 and recognize other vehicles, pedestrians, cyclists, lanes, road signs, and the like. The radar module 102 may include a radar 102a and an electronic control unit (ECU) 102b and may acquire relative position and relative speed of objects (e.g., other vehicles, pedestrians, cyclists, and the like) around the vehicle 1.

The DAS 100 is not limited to that shown in FIG. 1, and may further include a lidar that scans around the vehicle 1 and detects an object.

The above described electronic components may communicate with each other through vehicle communication network (NT). For example, the electrical components may exchange data therebetween through Ethernet, media oriented systems transport (MOST), Flexray, controller area network (CAN), local interconnect network (LIN), and the like. The DAS 100 may transmit a driving signal, a braking signal, and a steering signal to the EMS 11, the EBCM 31, and the EPS 41, respectively, through the NT.

FIG. 2 illustrates a configuration of a DAS according to an embodiment. FIG. 3 illustrates a field of view of a camera and a radar included in a DAS according to an embodiment.

Referring to FIG. 2, the vehicle 1 may include a driving system 10, a braking system 30, a steering system 40, and a DAS 100.

The drive system 10, the braking system 30 and the steering system 40 may be the same as the drive system 10, the braking system 30 and the steering system 40 shown in FIG. 1.

The DAS 100 may include a front camera 110, a front radar 120, corner radars 130, and a controller 140.

The front camera 110 may have a field of view 110a directed to the front of the vehicle 1, as shown in FIG. 3. The front camera 110 may be installed, for example, on the front windshield of the vehicle 1.

The front camera 110 may image the front of the vehicle 1 and acquire image data regarding the front of the vehicle 1. The image data regarding the front of the vehicle 1 may include position of another vehicle or a pedestrian or a cyclist or a lane existing in front of the vehicle 1.

The front camera 110 may include a plurality of lenses and an image sensor. The image sensor may include a plurality of photodiodes for converting light into electrical signals, and the plurality of photodiodes may be arranged in a two-dimensional matrix.

The front camera 110 may be electrically connected to a controller 140. For example, the front camera 110 may be connected to the controller 140 through a vehicle communication network NT, through a hard wire, or through a printed circuit board (PCB).

The front camera 110 may transmit the image data of the front of the vehicle 1 to the controller 140.

The front radar 120 may have a field of sensing 120a directed to the front of the vehicle 1. The front radar 120 may be installed, for example, on a grille or a bumper of the vehicle 1.

The front radar 120 may include a transmission antenna (or a transmission antenna array) that radiates transmission radio waves to the front of the vehicle 1 and a reception antenna (or a reception antenna array) that receives reflection radio waves reflected from an object. The front radar 120 may acquire sensing data from the transmission radio waves transmitted by the transmission antenna and the reflection radio waves received by the reception antenna. The sensing data may include distance information and speed information regarding another vehicle or a pedestrian, or a cyclist existing in front of the vehicle 1. The front radar 120 may calculate the relative distance to the object based on the phase difference (or time difference) between the transmission radio waves and the reflection radio waves, and calculate the relative speed of the object based on the frequency difference between the transmission radio waves and the reflected radio waves.

The front radar 120 may be connected to the controller 140 through a vehicle communication network NT, a hard wire, or a printed circuit board. The front radar 120 may transmit the sensing data to the controller 140.

The corner radars 130 includes a first corner radar 131 installed on the front right side of the vehicle 1, a second corner radar 132 installed on the front left side of the vehicle 1, a third corner radar 133 installed on the rear right side of the vehicle 1, and a fourth corner radar 134 installed on the rear left side of the vehicle 1.

The first corner radar 131 may have a field of sensing 131a directed to the front right side of the vehicle 1, as shown in FIG. 3. The front radar 120 may be installed on the right side of a front bumper of the vehicle 1, for example. The second corner radar 132 may have a field of sensing 132a directed to the front left side of the vehicle 1, and may be installed, for example, on the left side of the front bumper of the vehicle 1. The third corner radar 133 may have a field of sensing 133a directed to the rear right side of the vehicle 1 and may be installed, for example, on the right side of a rear bumper of the vehicle 1. The fourth corner radar 134 may have a field of sensing 134a directed to the rear left side of the vehicle 1 and may be installed, for example, on the left side of the rear bumper of the vehicle 1.

Each of the first, second, third and fourth corner radars 131, 132, 133, and 134 may include a transmission antenna and a reception antenna. The first, second, third, and fourth corner radars 131, 132, 133 and 134 acquire first corner radar data, second corner radar data, third corner radar data, and fourth corner radar data, respectively. The first corner radar data may include distance information and speed information regarding another vehicle, a pedestrian or a cyclist (hereinafter, referred to as "an object") existing on the front right side of the vehicle 1. The second corner radar data may include distance information and speed information regarding an object existing on the front left side of the vehicle 1. The third and fourth corner radar data may include distance information and speed information regarding an object existing on the rear right side of the vehicle 1 and distance information and speed information regarding an object located on the rear left side of the vehicle 1, respectively.

Each of the first, second, third, and fourth corner radars 131, 132, 133 and 134 may be connected to the first controller 140, for example, through a vehicle communication network NT, a hard wire, or a printed circuit board. The first, second, third, and fourth corner radars 131, 132, 133, and 134 may respectively transmit the first corner radar data, the second corner radar data, the third corner radar data, and the fourth corner radar data to the controller 140.

The controller 140 may include the ECU (101b in FIG. 1) of the camera module (101 in FIG. 1) and/or the ECU (102b in FIG. 1) of the radar module (102 in FIG. 1), and/or a separate integrated ECU.

The controller 140 may be electrically connected to the front camera 110 and the front radar 120. In addition, the controller 140 may be connected to the driving system 10, the braking system 30, and the steering system 40 through a vehicle communication network NT.

The controller 140 includes a processor 141 and a memory 142.

The processor 141 may process the image data of the front camera 110, and the sensing data of the radars 120 and 130, and generate a driving signal, a braking signal and a steering signal for controlling the driving system 30, the braking system 30 and the steering system 40. For example, the processor 141 may include an image signal processor for processing the image data of the front camera 110 and/or a digital signal processor for processing radar data of the radars 120 and 130 and/or a micro control unit (MCU) for generating a driving signal, a braking signal and/or a steering signal.

The processor 141 may sense objects (e.g., another vehicle, a pedestrian, a cyclist, and the like) in front of the vehicle 1 based on the image data of the front camera 110 and the sensing data of the front radar/corner radar 120 and 130.

The processor 141 may acquire a relative position (distance and direction) and type (for example, whether the object is another vehicle, a pedestrian, or a cyclist) of the objects existing in front of the vehicle 1 based on the image data of the front camera 110. The processor 141 may acquire position (distance and direction) and relative speed of the objects existing in front of the vehicle 1 based on the sensing data of the radars 120 and 130.

In addition, the processor 141 may match the objects sensed by the sensing data with the objects sensed by the image data, and acquire the type, the relative position, and the relative speed of the objects in front of the vehicle 1 based on a result of the matching.

The processor 141 may generate a driving signal, a braking signal, and a steering signal based on the relative position and the relative speed of front objects.

For example, the processor 141 may transmit a driving signal to the driving system 10 so that the distance to a preceding vehicle (or the time until reaching the position of the preceding vehicle) becomes a distance set by the driver. Further, the processor 141 may calculate a time to collision (TTC) (or a distance to collision (DTC)) between the vehicle 1 and the front object based on the position (distance) and the relative speed of the front objects, and warns the driver of a collision and may warn the driver of a collision or transmit a braking signal to the braking system 30 based on a result of comparing the TTC with a reference time.

The processor 141 may acquire relative position (distance and direction) and speed information (relative speed) of the objects on the sides of the vehicle 1 (front right, front left, rear right, and rear left) based on corner radar data of the plurality of corner radars 130.

The processor 141 may determine whether to avoid a collision with the front object by changing a traveling direction of the vehicle 1 based on the relative position (distance and direction) and the relative speed of the objects on the sides of the vehicle 1. For example, if there is no object located on the side of the vehicle 1, the processor 141 may transmit a steering signal to the steering system 40 in order to avoid the collision with the front object. In response to a collision with a side object being not predicted after steering of the vehicle 1 based on the position (distance and direction) and relative speed of the side objects, the processor 141 may transmit a steering signal to the steering system 40 to avoid the collision with the front object.

In response to the collision with the side object being predicted after steering of the vehicle 1 based on the position (distance and direction) and relative speed of the side objects, the processor 141 may not transmit a steering signal to the steering system 40.

In response to the collision with the front object is determined based on the time to collision or the distance to collision, the processor 141 may determine whether to avoid the collision with the front object by changing the traveling direction of the vehicle 1 based on the relative speed and the position (distance and direction) of the side objects of the vehicle 1. For example, in response to the side object of the vehicle 1 being not detected, the processor 141 may transmit a steering signal to the steering system 40 to avoid the collision with the front object. In response to the collision with the side object after steering of the vehicle 1 being not predicted based on the position (distance and direction) and relative speed of the side objects, the processor 141 may transmit a steering signal to the steering system 40 to avoid the collision with the front object. In response to the collision with the side object being predicted after steering of the vehicle 1 based on the position (distance and direction) and relative speed of the side objects, the processor 141 may not transmit a steering signal to the steering system 40.

As such, the processor 141 may transmit a steering signal for changing the traveling direction of the vehicle 1 to the steering system 40 in order to avoid the collision with the front object. However, it is known that there is a response delay time of approximately 200 ms (milliseconds) from when the steering device 42 receives the steering signal until the traveling direction of the vehicle 1 is changed. In order to more stably avoid collision with the front object, it is required to reduce the response delay time.

The processor 141 may control the EPS 41 to apply a dithering torque to the steering device 42 in order to reduce a response delay time of the steering device 42.

The dithering torque may represent a torque periodically applied to the steering device 42 to reduce friction of the steering device 42.

For example, the processor 141 may control the EPS 41 to alternately and periodically apply a torque in a first direction (for example, counterclockwise) and a torque in a second direction (for example, clockwise) to the steering device 42. For example, the processor 141 may control the EPS 41 to apply a periodic torque having a substantially sinusoidal shape to the steering device 42. However, the dithering torque is not limited thereto, and a torque applied to the steering device 42 approximately periodically is sufficient.

The processor 141 may vary the magnitude of the dithering torque based on a time to collision with the front object. For example, as the time to collision with the front object decreases, the processor 141 may increase the magnitude of the dithering torque.

The processor 141 may control the EPS 41 to periodically apply a pulse-shaped torque (hereinafter, referred to as a 'torque pulse') to the steering device 42. The processor 141 may vary a time interval at which the torque pulse is applied based on the time to collision with the front object. For example, as the time to collision with the front object decreases, the processor 141 may decrease the time interval at which the torque pulse is applied.

By means of the dithering torque, the steering device 42 is brought into motion. As is widely known, it is known that kinetic friction force in a motion state is smaller than maximum static friction force in a stationary state. In other words, the amount of torque required to change the direction of the wheel of the steering device 42 in the motion state may be reduced. Thereby, the steering device 42 may respond more quickly to the applied torque, and the response delay time of the steering device 42 may be reduced.

The memory 142 may store programs and/or data for processing image data by the processor 141, programs and/or data for processing radar data by the processor 141, and programs and/or data for generating a braking signal and/or a steering signal by the processor 141.

The memory 142 may temporarily memorize the image data received from the front camera 110 and/or the radar data received from the radars 120 and 130, and may temporarily memorize a result of processing the image data and/or the radar data of the processor 141.

The memory 142 may not only include a volatile memory, such as an S-RAM, a D-RAM, and the like, but also include a non-volatile memory, such as a flash memory, a read only memory (ROM), an erasable programmable read only memory (EPROM), and the like.

As such, the controller 140 may transmit a braking signal to the braking system 30 based on whether the collision with the front object is predicted. Further, the controller 140 may transmit a steering signal to the steering system 40 in order to avoid the collision with the front object.

Further, in response the collision of the front object being expected, the controller 140 may control the EPS 41 to apply a dithering torque to the steering device 42 in order to reduce a response delay time of the steering device 42.

The DAS 100 is not limited to that shown in FIG. 2, and may further include a lidar that scans around the vehicle 1 and detects an object.

FIG. 4 illustrates a method for collision avoidance of a driver assistance apparatus according to an embodiment.

A collision avoidance method 1000 of the DAS 100 will be described with reference to FIG. 4.

The DAS 100 identifies an object in front of the vehicle 1 (1010).

While the vehicle 1 is driving or stopped, the front camera 110 of the DAS 100 may acquire image data of the front of the vehicle 1. The controller 140 of the DAS 100 may acquire image data from the front camera 110. The controller 140 may identify and classify objects located in front and/or around the vehicle 1 based on the image data. For example, the controller 140 may identify an object including a lane marker, a sign, another vehicle, a pedestrian, a bicycle, a road boundary, an animal, a traffic light, and the like, located in front of the vehicle 1. Also, the controller 140 may classify the identified object into a lane marker, a sign, another vehicle, a pedestrian, a bicycle, a road boundary, an animal, a traffic light, and the like.

While the vehicle 1 is driving or stopped, the front radar 120 of the DAS 100 may acquire sensing data of the front of the vehicle 1. The controller 140 may acquire sensing data from the front radar 120. The controller 140 may identify objects located in front of and/or around the vehicle 1 based on the sensing data.

The controller 140 may identify the objects located in front and/or around the vehicle 1 depending on only the image data of the front camera 110, or objects positioned in front of the vehicle 1 depending on only the sensing data of the front radar 120.

Further, the controller 140 may identify objects located in front of the vehicle 1 based on the image data of the front camera 110 and the sensing data of the front radar 120. For example, the controller 140 may identify a common object between objects identified based on the image data of the front camera 110 and objects identified based on the sensing data of the front radar 120.

The DAS 100 determines whether the collision with the front object of the vehicle 1 is expected (1020).

The DAS 100 may identify a relative position (distance and direction) and a relative speed of the front object of the vehicle 1.

The controller 140 may identify relative position of the objects located in front of the vehicle 1 based on the image data, and identify the relative speed of the objects located in front of the vehicle 1 based on a plurality of consecutive image data. For example, the controller 140 may identify relative position of the objects based on the positions of the object (coordinates of pixels occupied by the object in the image frame) and the sizes of the object (the number of pixels occupied by the object in the image frame), in the image based on the image data. Also, the controller 140 may identify lateral relative speed of the objects based on a change in the position of the object (coordinates of pixels occupied by the object in the image frame) in the image by the plurality of consecutive image data, and identify the longitudinal relative speed of the objects based on a change in the size of the objects (the number of pixels occupied by the object in the image frame).

Also, the controller 140 may identify the relative position and relative speed of the objects located in front and/or around the vehicle 1 based on the sensing data. For example, the controller 140 may identify the relative position of the objects located in front and/or around the vehicle 1 based on a time until the radio wave reflected from the object is received and an angle at which the radio wave was received.

Further, the controller 140 may identify the relative position and relative speed of the object located in front of the vehicle 1 based on the image data of the front camera 110 and the sensing data of the front radar 120. For example, the controller 140 may determine the lateral relative position and lateral relative speed of the object based on the image data of the front camera 110, and may determine the relative longitudinal position and the longitudinal relative speed of the object based on the sensing data of the front radar 120. Here, the lateral direction may indicate a direction perpendicular to the traveling direction of the vehicle 1, and the longitudinal direction may indicate a direction parallel to the traveling direction of the vehicle 1.

Further, the controller 140 may predict whether the vehicle 1 will collide with the front object based on the relative position (distance and direction) and the relative speed of the front object. The controller 140 may determine a time to collision (TTC) between the vehicle 1 and a target based on the relative position and relative speed of the objects. For example, the controller 140 may calculate a time to collision (TTC) between the vehicle 1 and the preceding vehicle based on the distance to the preceding vehicle and the relative speed of the preceding vehicle.

The controller 140 may also compare a time to collision (TTC) with a preceding vehicle with a reference time, and determine whether the time to collision (TTC) with a preceding vehicle is less than the reference time. The reference time may be set empirically or empirically. For example, the reference time may be set based on a minimum time required to avoid a collision by a general driver's braking or steering or based on a minimum time required to avoid a collision by automatic braking or automatic steering of the DAS 100.

Further, the controller 140 may predict a distance to collision (DTC) between the vehicle 1 and the preceding vehicle based on the relative position and relative speed of the objects. The controller 140 may calculate a distance to collision (DTC) with the preceding vehicle Based on the product of the driving speed of the vehicle 1 and the time to collision (TTC) with the preceding vehicle. The controller 140 may also compare the distance to collision (DTC) with the preceding vehicle with a reference time, and determine whether a distance to collision (DTC) with the preceding vehicle is smaller than a reference distance.

In response to predicting that the vehicle 1 will not collide with the front object (NO of 1020), the DAS 100 may identify the front object again and predict whether the vehicle 1 will collide with the front object again.

In response to predicting that the vehicle 1 will collide with the front object (YES of 1020), the DAS 100 determines whether the side object of the vehicle 1 exists (1030).

For example, in response to the time to collision (TTC) being less than or equal to the reference time, the controller 140 may predict that the vehicle 1 will collide with the front object.

The controller 140 may receive sensing data from the corner radar 130 and detect the object located on the sides (front right, front left, rear right, rear left) of the vehicle 1 based on the detected data. Further, the controller 140 may acquire the relative position (distance and direction) and the relative speed of the side object based on the sensing data of the corner radar 130

In response to the side object of the vehicle 1 being not detected (NO in 1030), the DAS 100 performs emergency steering (1040).

In response to the object located on the side of the vehicle 1 being not detected, the controller 140 may transmit a steering signal to the steering system 40 in order to avoid a collision with the front object of the vehicle 1.

For example, the vehicle 1 may travel behind the preceding vehicle.

In response to the preceding vehicle suddenly being brake, the controller 140 may predict a collision with the preceding vehicle.

In response to the collision with a preceding vehicle being predicted, the controller 140 may detect an object on the right side of the vehicle 1 based on the radar data of the first and third corner radars 131 and 133, and detect an object on the left side of the vehicle 1 based on radar data of the second and fourth corner radars 132 and 134. In response to an object being not detected on either the left or right side of the vehicle 1, the controller 140 may generate a steering signal so that the traveling direction of the vehicle 1 is changed in a direction in which the object is not detected, and may transmit a steering signal to the steering system 40. Thereby, the vehicle 1 may change the traveling direction to the left and pass the left side of the preceding vehicle.

In response to the side object of the vehicle 1 being detected (YES in 1030), the DAS 100 performs emergency braking (1050).

In response to the object located on the side of the vehicle 1 being detected, the controller 140 may determine that a collision with another vehicle may not be avoided through steering, and may transmit a braking signal to the braking system 30 to reduce an impact caused by the collision with the front object.

FIG. 5 illustrates an emergency steering method of a driver assistance apparatus according to an embodiment. FIG. 6 illustrates a torque applied to a steering device by the emergency steering method shown in FIG. 5. FIG. 7 illustrates collision avoidance of a vehicle by the emergency steering method shown in FIG. 5.

An emergency steering method 1100 of the DAS 100 is described together with FIGS. 8, 9 and 10.

The DAS 100 identifies a front object of the vehicle 1 (1110).

Operation 1110 may be the same as operation 1010 illustrated in FIG. 4.

The DAS 100 determines whether a time to collision (TTC) with the front object is equal to or less than a first time (1120).

Operation 1120 may be similar to operation 1020 illustrated in FIG. 4. For example, the controller 140 may identify the relative position (distance and direction) and the relative speed of a preceding vehicle of the vehicle 1. The controller 140 may determine a time to collision (TTC) between the vehicle 1 and the preceding vehicle based on the relative position and relative speed of the preceding vehicle. The controller 140 may compare a time to collision (TTC) with the preceding vehicle with a reference time, and determine whether the time to collision (TTC) with the preceding vehicle is less than the first time. The first time may be set empirically or empirically.

In addition, the controller 140 may predict a distance to collision (DTC) between the vehicle 1 and the preceding vehicle based on the relative position and relative speed of the objects, and determine whether the distance to collision (DTC) with the preceding vehicle is equal to or less than a first distance.

In response to the time to collision with the front object being greater than the first time (No in 1120), the DAS 100 may again identify the relative position (distance and direction) and the relative speed of the preceding vehicle of the vehicle 1, and determine again whether the time to collision (TTC) with the preceding vehicle TTC is less than the first time.

In response to the time to collision with the front object being equal to or less than the first time (YES in 1120), the DAS 100 controls the steering system 40 to apply a dithering torque (1130).

For example, in response to the time to collision with the preceding vehicle being equal to or less than the first time, the controller 140 may predict the collision between the vehicle 1 and the preceding vehicle. Also, the controller 140 may prepare an emergency clause for avoiding the collision with the preceding vehicle.

The controller 140 may provide a steering preparation signal to the EPS 41 so that the dithering torque is applied to the steering device 42. In response to the steering preparation signal of the DAS 100, the EPS 41 may apply a periodically varying torque (dithering torque) to the steering device 42 as shown in FIG. 6.

By the dithering torque, the steering device 42 is switched to a motion state, and the force (friction force) required to change the traveling direction of the vehicle 1 is reduced. Thereby, a response time of the steering device 42 for changing the traveling direction of the vehicle 1 may be reduced.

In addition, a magnitude of the dithering torque may be varied as shown in FIG. 6. For example, the magnitude of the dithering torque may increase over time. As another example, the magnitude of the dithering torque may increase as the time to the collision (TTC) with the preceding vehicle decreases.

Thereafter, the DAS 100 determines whether the time to collision with the front object is less than or equal to a second time (1140).

Operation 1140 may be similar to operation 1020 illustrated in FIG. 4. For example, the controller 140 may determine the time to collision (TTC) between the vehicle 1 and the preceding vehicle based on the relative position and relative speed of the preceding vehicle, and determine whether the time to the collision (TTC) with the preceding vehicle is less than the second time. The second time period is less than the first time period and may be set empirically or empirically.

Further, the controller 140 may predict a distance to collision (DTC) between the vehicle 1 and the preceding vehicle based on the relative position and relative speed of the objects and determine whether the distance to the collision (DTC) with the preceding vehicle is equal to or less than the second distance. The second distance may be less than the first distance.

In response to the time to collision with the front object being greater than the second time (No in operation 1140), the DAS 100 may continue to control the steering system 40 to apply the dithering torque.

In response to the time to collision with the front object being less than or equal to the second time (YES in 1140), the DAS 100 controls the steering system 40 to apply the first torque in the first direction (1150).

For example, in response to the time to collision with the preceding vehicle being equal to or less than the second time, the controller 140 may predict that the collision between the vehicle 1 and the preceding vehicle is imminent. In addition, the controller 140 may perform emergency steering to avoid collision with the preceding vehicle. The controller 140 may provide a first steering control signal to the EPS 41 so that a first torque in a first direction (for example, clockwise or counterclockwise) is applied to the steering device 42.

In response to the first steering control signal of the DAS 100, the EPS 41 may apply the first torque in the first direction (for example, counterclockwise) to the steering device 42 as shown in FIG. 6. By the first torque, the steering device 42 may change the traveling direction of the vehicle 1 to the left as shown in FIG. 7.

Thereafter, the DAS 100 determines whether a time to collision without the collision with the front object has elapsed (1160).

For example, in order to identify whether the collision with the preceding vehicle is avoided, the controller 140 may determine whether the time to collision (TTC) previously expected has elapsed without the collision with the preceding vehicle. In other words, the controller 140 may determine whether the collision with the preceding vehicle did not occur at the expected time.

The controller 140 may receive information about the collision of the vehicle 1 from an airbag control unit (ACU), and determine whether the time to collision (TTC) previously expected has elapsed without the collision with the preceding vehicle, based on the information about the collision of the vehicle 1.

Further, in order to identify whether the collision with the preceding vehicle is avoided, the controller 140 may determine whether the time to collision with the preceding vehicle increases. For example, the controller 140 may determine the time to collision (TTC) between the vehicle 1 based on the relative position and relative speed of the preceding vehicle and the preceding vehicle and determine whether the time to collision with the preceding vehicle increases, In response to the time to collision being not elapsed without the collision with the front object (NO in 1160), the DAS 100 may continue to control the steering system 40 so that the first torque is applied. Also, in response to the collision with the front object being detect (NO in step 1160), the DAS 100 may stop outputting the first steering control signal.

In response to the time to collision without collision with the object in front being elapsed (Yes in 1160), the DAS 100 controls the steering system 40 to apply the second torque in the second direction (1170).

For example, in response to the time to collision without collision with the preceding vehicle being elapsed, the controller 140 may determine that the collision with the preceding vehicle is avoided. Also, in response to the time to collision with the preceding vehicle being increase, the controller 140 may determine that the collision with the preceding vehicle is also avoided.

Accordingly, the controller 140 may perform steering to maintain a lane after avoiding a collision with a preceding vehicle. The controller 140 may provide a second steering control signal to the EPS 41 so that a second torque in a second direction (for example, counterclockwise or clockwise) is applied to the steering device 42.

In response to the second steering control signal of the DAS 100, the EPS 41 may apply the second torque in the second direction (for example, clockwise) to the steering device 42 as shown in FIG. 6. By the second torque, the steering device 42 may change the traveling direction of the vehicle 1 to the right as shown in FIG. 7.

As described above, the DAS 100 may predict the collision with the front object, and control the steering system 40 to change the traveling direction of the vehicle 1 to avoid the collision in response to the collision with the front object being expected. In particular, the driver assistance device 100 may control the EPS 41 to apply a dithering torque to the steering device 42 in order to reduce a response delay time of the steering system 40.

Thereby, the response time of the steering system 40 is reduced, and the vehicle 1 may avoid the collision with the front object more quickly.

FIG. 8 illustrates an emergency steering method of a driver assistance apparatus according to an embodiment. FIG. 9 illustrates a torque applied to the steering device by the emergency steering method shown in FIG. 8. FIG. 10 illustrates collision avoidance of a vehicle by the emergency steering method shown in FIG. 8.

An emergency steering method 1200 of the DAS 100 is described together with FIGS. 8, 9 and 10.

The DAS 100 identifies a front object of the vehicle 1 (1210).

Operation 1210 may be the same as operation 1010 illustrated in FIG. 4.

The DAS 100 determines whether the time to collision with the front object is less than or equal to a first time (1220).

Operation 1220 may be the same as operation 1120 illustrated in FIG. 5.

In response to the time to collision with the front object being less than or equal to the first time (Yes in 1220), the DAS 100 controls the steering system 40 to apply a dithering torque (1230).

Operation 1230 may be the same as operation 1130 shown in FIG. 5.

For example, the controller 140 may provide a steering preparation signal to the EPS 41 so that the dithering torque is applied to the steering device 42.

Thereafter, the DAS 100 determines whether the time to collision with the front object is less than or equal to a second time (1240).

Operation 1240 may be the same as operation 1140 illustrated in FIG. 5. The second time period is less than the first time period and may be set empirically or empirically.

In response to the time to collision with the front object being greater than the second time (No in 1240), the DAS 100 may continue to control the steering system 40 so that the dithering torque is applied.

In response to the time to collision with the front object being equal to or less than the second time (Yes in 1140), the DAS 100 controls the steering system 40 to apply the first torque of the first magnitude (1250).

For example, in response to the time to collision with the preceding vehicle being less than or equal to the second time, the controller 140 may predict that a collision between the vehicle 1 and the preceding vehicle is imminent, and provide a first steering control signal to the EPS 41 so that the first torque of the first magnitude is applied to the steering device 42.

In response to the first steering control signal of the DAS 100, the EPS 41 may apply the first torque of the first magnitude to the steering device 42 as shown in FIG. 9.

By the first torque, the steering device 42 may change the traveling direction of the vehicle 1 to the left as shown in FIG. 10.

Thereafter, the DAS 100 determines whether the time to collision with the front object is equal to or less than a third time (1260).

Operation 1260 may be similar to operation 1240. For example, the controller 140 may determine the time to collision (TTC) between the vehicle 1 and the preceding vehicle based on the relative position and relative speed of the preceding vehicle, and determine whether the time to collision (TTC) with the preceding vehicle is less than the third time. The third time period is less than the second time period and may be set empirically or empirically.

In response to the time to collision with the front object being greater than the third time (NO in 1260), the DAS 100 may continue to control the steering system 40 so that the first torque is applied.

In response to the time to collision with the front object being less than the third time (YES in 1260), the DAS 100 controls the steering system 40 so that a second torque of a second magnitude is applied (1270).

For example, in response to the time to collision with the preceding vehicle being less than or equal to the third time, the controller 140 may determine that the collision with the preceding vehicle is not avoided by the first torque of the first magnitude. In order to avoid the collision with a preceding vehicle, the controller 140 may provide a second steering control signal to EPS 41 so that the second torque of the second magnitude is applied to the steering device 42. The second magnitude of the second torque may be greater than the first magnitude of the first torque.

In response to the second steering control signal from the DAS 100, the EPS 41 may apply the second torque of the second magnitude to the steering device 42 as shown in FIG. 9. By the second torque, the steering device 42 may change the traveling direction of the vehicle 1 more to the left as shown in FIG. 10.

As described above, the DAS 100 may predict the collision with the front object, and control the steering system 40 to generate a torque for changing the traveling direction of the vehicle 1 in order to avoid the collision in order to avoid a collision in response to the collision with the front object being expected. Also, the DAS 100 may control the steering system 40 to vary the torque applied to the steering device 42 depending on the time to collision with the front object. In particular, the DAS 100 may control the steering system 40 to increase the torque applied to the steering device 42 as the time to collision with the front object decreases.

Accordingly, the DAS 100 may reduce lateral acceleration caused by a sudden change in the traveling direction of the vehicle 1, and may prevent secondary damage to the driver due to the lateral acceleration.

Meanwhile, the disclosed embodiments may be embodied in the form of a recording medium storing instructions executable by a computer. The instructions may be stored in the form of program code and, when executed by a processor, may generate a program module to perform the operations of the disclosed embodiments. The recording medium may be embodied as a computer-readable recording medium.

The computer-readable recording medium includes all kinds of recording media in which instructions which can be decoded by a computer are stored, for example, a Read Only Memory (ROM), a Random Access Memory (RAM), a magnetic tape, a magnetic disk, a flash memory, an optical data storage device, and the like.

According to an aspect of the disclosed invention, it is possible to provide a driver assistance system and a driver assistance method capable of avoiding a collision between a vehicle and a front object using emergency steering.

According to an aspect of the disclosed invention, it is possible to provide a driver assistance system and a driver assistance method capable of shortening the response time for emergency steering.

Exemplary embodiments of the present disclosure have been described above. In the exemplary embodiments described above, some components may be implemented as a "module". Here, the term 'module' means, but is not limited to, a software and/or hardware component, such as a Field Programmable Gate Array (FPGA) or Application Specific Integrated Circuit (ASIC), which performs certain tasks. A module may advantageously be configured to reside on the addressable storage medium and configured to execute on one or more processors.

Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The operations provided for in the components and modules may be combined into fewer components and modules or further separated into additional components and modules. In addition, the components and modules may be implemented such that they execute one or more CPUs in a device.

With that being said, and in addition to the above described exemplary embodiments, embodiments can thus be implemented through computer readable code/instructions in/on a medium, e.g., a computer readable medium, to control at least one processing element to implement any above described exemplary embodiment. The medium can correspond to any medium/media permitting the storing and/or transmission of the computer readable code.

The computer-readable code can be recorded on a medium or transmitted through the Internet. The medium may include Read Only Memory (ROM), Random Access Memory (RAM), Compact Disk-Read Only Memories (CD-ROMs), magnetic tapes, floppy disks, and optical recording medium. Also, the medium may be a non-transitory computer-readable medium. The media may also be a distributed network, so that the computer readable code is stored or transferred and executed in a distributed fashion. Still further, as only an example, the processing element could include at least one processor or at least one computer processor, and processing elements may be distributed and/or included in a single device.

While exemplary embodiments have been described with respect to a limited number of embodiments, those skilled in the art, having the benefit of this disclosure, will appreciate that other embodiments can be devised which do not depart from the scope as disclosed herein. Accordingly, the scope should be limited only by the attached claims.

Although exemplary embodiments of the present disclosure have been described for illustrative purposes, those skilled in the art will appreciate that various modifications, additions and substitutions are possible, without departing from the scope and spirit of the disclosure. Therefore, exemplary embodiments of the present disclosure have not been described for limiting purposes.

What is claimed is:

1. An apparatus for assisting driving of a host vehicle, the apparatus comprising:
    a camera mounted to the host vehicle and having a field of view in front of the host vehicle, the camera configured to acquire image data; and
    a controller including a processor configured to process the image data, and configured to:
    identify at least one object obstructing driving of the host vehicle based on processing of the image data,
    control an electronic power steering control module (EPS) to apply a first torque to a steering device of the host vehicle, in response to a remaining time until a collision between the host vehicle and the front object being less than or equal to a first time, wherein the first torque includes a dithering torque comprising a torque in a first direction and a torque in a second direction that are alternately applied to the steering device, and
    control the steering device to apply a second torque that is greater than the first torque and is directed toward one of the first direction and the second direction to the steering device to change a traveling direction of the host vehicle, in response to a time to collision between the host vehicle and the front object being less than or equal to a second time, the second time being less than the first time,
    wherein the controller is configured to control the EPS to apply a third torque larger than the second torque to the steering device in response to the time to collision between the host vehicle and the front object being less than or equal to a third time less than the second time.

2. The apparatus of claim 1, wherein the first torque includes the dithering torque having either a periodically varying magnitude or a periodically varying time interval applied to the steering device.

3. The apparatus of claim 2, wherein the controller is configured to control the steering device to increase the periodically varying magnitude of the dithering torque as a time to collision with the at least one object decreases.

4. The apparatus of claim 2, wherein the controller is configured to control the steering device to periodically apply a pulse-shaped torque to the steering device, and to decrease the periodically varying time interval between the pulse-shaped torque as the time to collision with the at least one object decreases.

5. The apparatus of claim 1, wherein the first torque includes the dithering torque having a sine wave shape or a square wave shape applied to the steering device.

6. The apparatus of claim 1, wherein the controller is configured to control the steering device to apply a fourth torque in a direction opposite to the second torque to the steering device in response to the time to collision between the host vehicle and the front object being increase.

7. The apparatus of claim 1, further comprising: a sensor mounted to the host vehicle, having a field of sensing for at least one of a front and a side of the host vehicle, in a group consisting of a radar sensor and a Light Detection and Ranging (LiDAR) sensor, and the camera configured to acquire sensing data,
    wherein the processor is configured to process the sensing data, and the controller is configured to identify the time to collision with the at least one object based on processing of the sensing data.

8. A method for assisting driving of a host vehicle, the method comprising:
    processing image data acquired by a camera installed in a vehicle and having a front view of the host vehicle;
    identifying at least one object obstructing driving of the host vehicle based on the image data;
    applying a first torque to a steering device of the host vehicle by controlling an electronic power steering control module (EPS) of the host vehicle in response to a remaining time until a collision between the host vehicle and the front object being less than or equal to a first time, wherein the first torque includes a dithering torque comprising a torque in a first direction and a torque in a second direction that are alternately applied to the steering device; and applying a second torque greater than the first torque and directed toward one of the first direction and the second direction to the steering device to change a traveling direction of the host vehicle, in response to a time to collision between the host vehicle and the front object being less than or equal to a second time, the second time being less than the first time; and applying a third torque larger than the second torque to the steering device based on the time to collision between the host vehicle and the front object being less than a third time less than the second time.

9. The method of claim 8, wherein the first torque includes the dithering torque having either a periodically varying magnitude or a periodically varying time interval.

10. The method of claim 9, wherein applying of the dithering torque includes increasing the periodically varying magnitude of the dithering torque as a remaining time until the collision with the at least one object decreases.

11. The method of claim 9, wherein applying of the dithering torque includes:

periodically applying a pulse-shaped torque to the steering device; and decreasing the periodically varying time interval between the pulse-shaped torque as the time to collision with the at least one object decreases.

12. The method of claim 8, wherein the first torque includes the dithering torque having a sine wave shape or a square wave shape applied to the steering device.

13. The method of claim 8, further comprising: applying a third fourth torque in a direction opposite to the second torque to the steering device based on the time to collision between the host vehicle and the front object being increase.

14. The method of claim 8, further comprising: acquiring sensing data by a sensor mounted to the host vehicle and having a field of sensing of at least one of a front and a side of the host vehicle, in a group consisting of a radar sensor and a LIDAR sensor; and predicting a collision with the at least one object based on the sensing data.

15. An apparatus for assisting driving of a host vehicle, the apparatus comprising:

a camera mounted to the host vehicle and having a field of view in front of the host vehicle, the camera configured to acquire image data; and a controller including a processor configured to process the image data, and configured to:

identify at least one object obstructing driving of the host vehicle based on processing of the image data, and control an electronic power steering control module (EPS) to apply a periodically varying dithering torque to a steering device of the host vehicle when a collision with the at least one object is expected, wherein the periodically varying dithering torque comprises alternately applying, for a predetermined period, a first torque in a first direction and a second torque in a second direction opposite to the first direction to the steering device, wherein a magnitude of the first torque in and a magnitude of the second torque are gradually increasing as a time to collision with the at least one object decreases and a number of times that the first torque and the second torque are applied during the predetermined period is equal.

* * * * *